US008539938B2

(12) United States Patent
Elwart et al.

(10) Patent No.: US 8,539,938 B2
(45) Date of Patent: Sep. 24, 2013

(54) FUEL SYSTEMS AND METHODS FOR CONTROLLING FUEL SYSTEMS IN A VEHICLE WITH MULTIPLE FUEL TANKS

(75) Inventors: Shane Elwart, Ypsilanti, MI (US); James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1196 days.

(21) Appl. No.: 12/403,259

(22) Filed: Mar. 12, 2009

(65) Prior Publication Data

US 2010/0229966 A1 Sep. 16, 2010

(51) Int. Cl.

| | |
|---|---|
| ***F02B 47/00*** | (2006.01) |
| ***F02M 25/00*** | (2006.01) |
| ***E03B 11/00*** | (2006.01) |
| ***G01M 3/04*** | (2006.01) |

(52) U.S. Cl.
USPC ........... 123/575; 137/255; 137/256; 137/262; 220/4.14; 73/114.38

(58) Field of Classification Search
USPC ................. 123/575, 576, 577, 578, 515, 516, 123/518, 519, 521, 525, 526, 527, 529, 198 D, 123/198 DB, 520; 137/255, 256, 262, 263, 137/264, 265, 266, 267, 587, 589, 312, 571; 220/746, 749, 750, 4.14; 73/114.38, 49.2
See application file for complete search history.

(56) References Cited

U.S. PATENT DOCUMENTS 4,031,864 A 6/1977 Crothers
5,092,305 A * 3/1992 King ............................ 123/575
5,411,058 A 5/1995 Welsh et al.
5,560,344 A 10/1996 Chan
5,685,268 A * 11/1997 Wakemen ................ 123/198 D
5,921,263 A * 7/1999 Negley, III ........................ 137/3
6,164,123 A * 12/2000 Corkill .......................... 73/49.7
6,250,260 B1 * 6/2001 Green ...................... 123/27 GE
6,276,343 B1 * 8/2001 Kawamura et al. ........... 123/520
6,283,098 B1 * 9/2001 Corkill ......................... 123/520
6,711,893 B2 3/2004 Ueda et al.
6,792,966 B2 * 9/2004 Harvey ........................ 137/265
6,834,534 B2 * 12/2004 Halla et al. .................... 73/49.2
7,013,844 B2 * 3/2006 Oda .................................. 123/3
7,107,971 B2 * 9/2006 Spink et al. .................. 123/520
7,302,933 B2 * 12/2007 Kerns ........................... 123/431
2001/0022173 A1 * 9/2001 Fabre ........................... 123/519

(Continued)

OTHER PUBLICATIONS

U.S. Appl. No. 12/402,999, filed Mar. 12, 2009, Elwart.

*Primary Examiner* — Stephen K Cronin
*Assistant Examiner* — Raza Najmuddin
(74) *Attorney, Agent, or Firm* — Julia Voutyras; Alleman Hall McCoy Russell & Tuttle LLP

(57) ABSTRACT

Fuel systems and methods for controlling fuel systems in a vehicle with multiple fuel tanks are provided. An exemplary vehicle fuel system includes a first fuel tank including a first pressure sensor, and a second fuel tank. The system may further include a fuel tank isolation valve positioned to selectively decouple the first fuel tank and the second fuel tank. The system may further include an electronic controller configured to identify which of the first fuel tank and second fuel tank includes a fuel system leak by selectively decoupling the first fuel tank and the second fuel tank via the fuel tank isolation valve, responsive to an identification of the fuel system leak.

9 Claims, 5 Drawing Sheets

(56) References Cited

U.S. PATENT DOCUMENTS

| | | | | |
|---|---|---|---|---|
| 2001/0029933 | A1* | 10/2001 | Fabre | 123/520 |
| 2001/0032625 | A1* | 10/2001 | Fabre | 123/520 |
| 2001/0032626 | A1* | 10/2001 | Fabre | 123/520 |
| 2002/0189328 | A1* | 12/2002 | Saito et al. | 73/49.7 |
| 2003/0015179 | A1* | 1/2003 | Kawano | 123/520 |
| 2003/0019481 | A1* | 1/2003 | Kawano | 123/520 |
| 2004/0154596 | A1* | 8/2004 | Mitani et al. | 123/509 |
| 2004/0200460 | A1* | 10/2004 | Mitani et al. | 123/520 |
| 2005/0126265 | A1* | 6/2005 | Herzog et al. | 73/49.2 |
| 2005/0257607 | A1* | 11/2005 | Suzuki | 73/118.1 |
| 2006/0162705 | A1* | 7/2006 | Grunwald et al. | 123/520 |
| 2007/0092770 | A1 | 4/2007 | Obata et al. | |
| 2007/0151331 | A1 | 7/2007 | Kawanishi et al. | |
| 2007/0215127 | A1 | 9/2007 | Dearth et al. | |
| 2008/0072881 | A1* | 3/2008 | Leone et al. | 123/516 |
| 2009/0204309 | A1* | 8/2009 | Eser et al. | 701/102 |
| 2009/0277251 | A1* | 11/2009 | Takakura | 73/40.7 |
| 2010/0230001 | A1 | 9/2010 | Elwart | |

* cited by examiner

FUEL SYSTEMS AND METHODS FOR CONTROLLING FUEL SYSTEMS IN A VEHICLE WITH MULTIPLE FUEL TANKS

FIELD

The present application relates to methods and systems for controlling fuel and fuel vapor flow through a fuel system of a vehicle with more than one fuel tank.

SUMMARY AND BACKGROUND

Recently, there has been an increased interest in using more than one fuel type to fuel a vehicle engine such that different fuels can be used under different engine operating conditions.

A system for selectively fuelling a vehicle with multiple fuel tanks via a single filler port fitting is described in U.S. patent application Ser. No. 12/402,999, (concurrently filed herewith), which is hereby incorporated by reference. Different fuel types may be stored in each fuel tank, by detection of a fuel type in a fuel reservoir and subsequent direction of the fuel to a selected fuel tank.

The Applicants have recognized that prior fuel system leak diagnostic systems typically include a fuel pressure sensor for measuring pressure in a fuel tank or fuel system, and do not account for the various additional parts of a vehicle with multiple fuel tanks that may contribute to errors in diagnostic testing. Conventionally, as complexity is increased in a vehicle system, additional sensors are placed throughout a system to achieve accurate monitoring of operating conditions, thereby increasing complexity and costs.

Thus, fuel systems and methods for controlling fuel systems in a vehicle with multiple fuel tanks are herein provided. An exemplary vehicle fuel system includes a first fuel tank including a first pressure sensor, and a second fuel tank. The system may further include a fuel tank isolation valve positioned to selectively decouple the first fuel tank and the second fuel tank. The system may further include an electronic controller configured to identify which of the first fuel tank and second fuel tank includes a fuel system leak by selectively decoupling the first fuel tank and the second fuel tank via the fuel tank isolation valve, responsive to an identification of the fuel system leak.

By selectively decoupling multiple tanks in a fuel system, fuel system leak diagnostics can be performed without the addition of multiple pressure sensors (although multiple sensors may be used, if desired). In one example, by systematically isolating a first fuel tank from a second fuel tank and correlating system response with an expected response, a fuel system leak, if present, can be localized and identified even when more information is available about one tank than another. Further, fuel types can be kept separate in multiple fuel tanks while maintaining accuracy of fuel system leak diagnostics.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
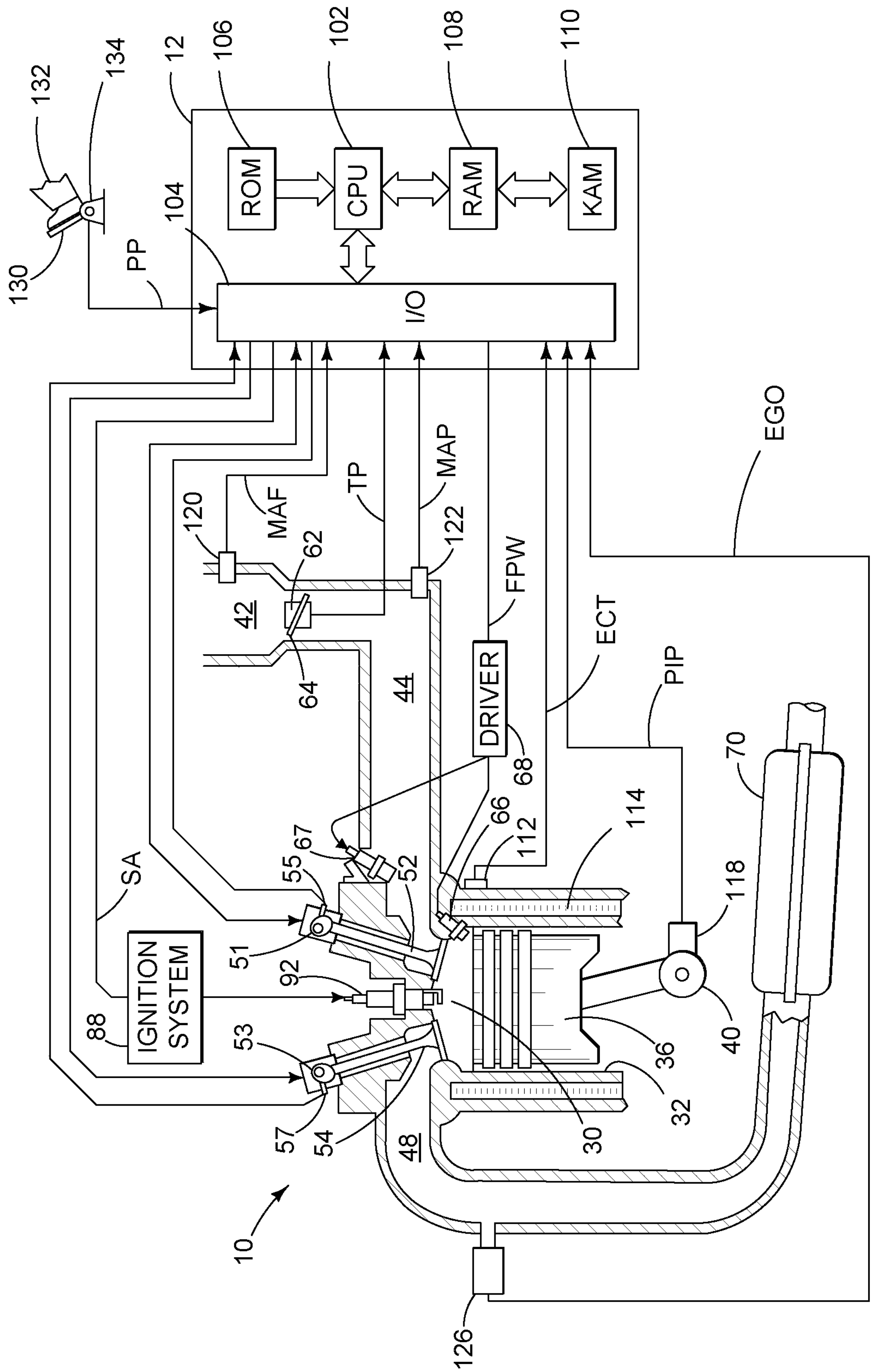
FIG. 1 is a schematic view of a cylinder of an engine of a vehicle.
Figure 2:
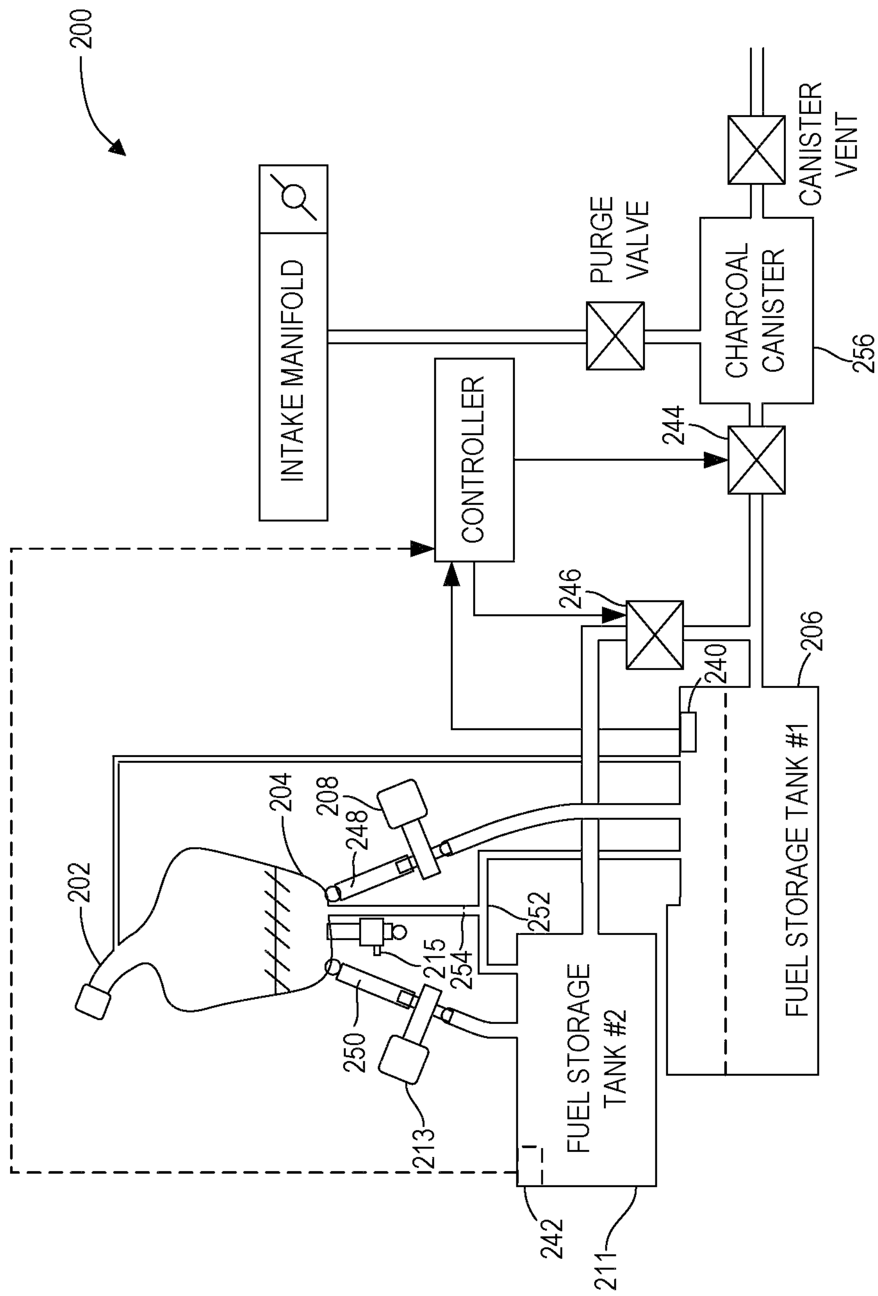
FIG. 2 is a schematic view of a vehicle fuel system with multiple fuel tanks.
Figure 3:
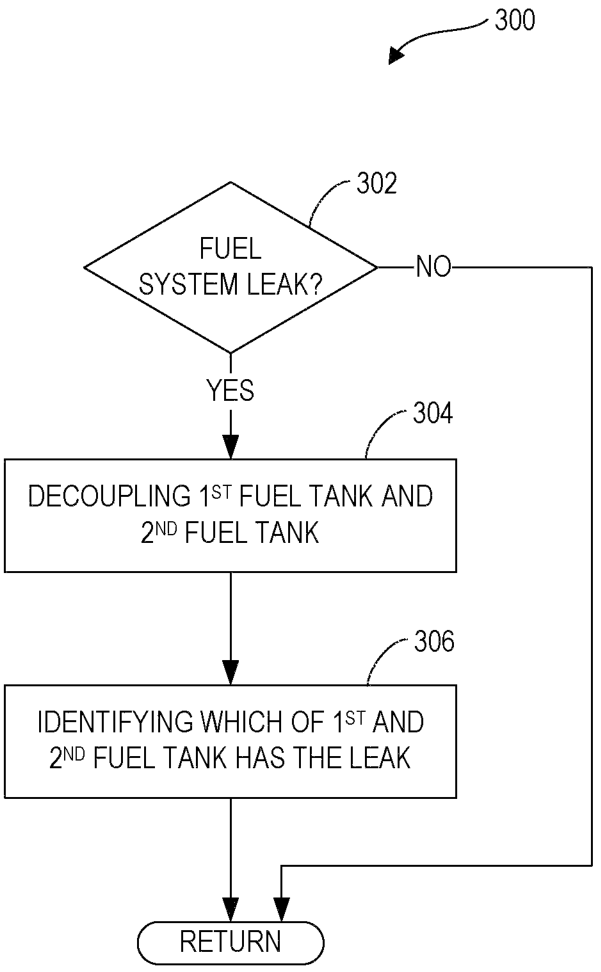
FIG. 3 is a flowchart illustrating an example method overview for controlling a fuel system of a vehicle.
Figure 4:
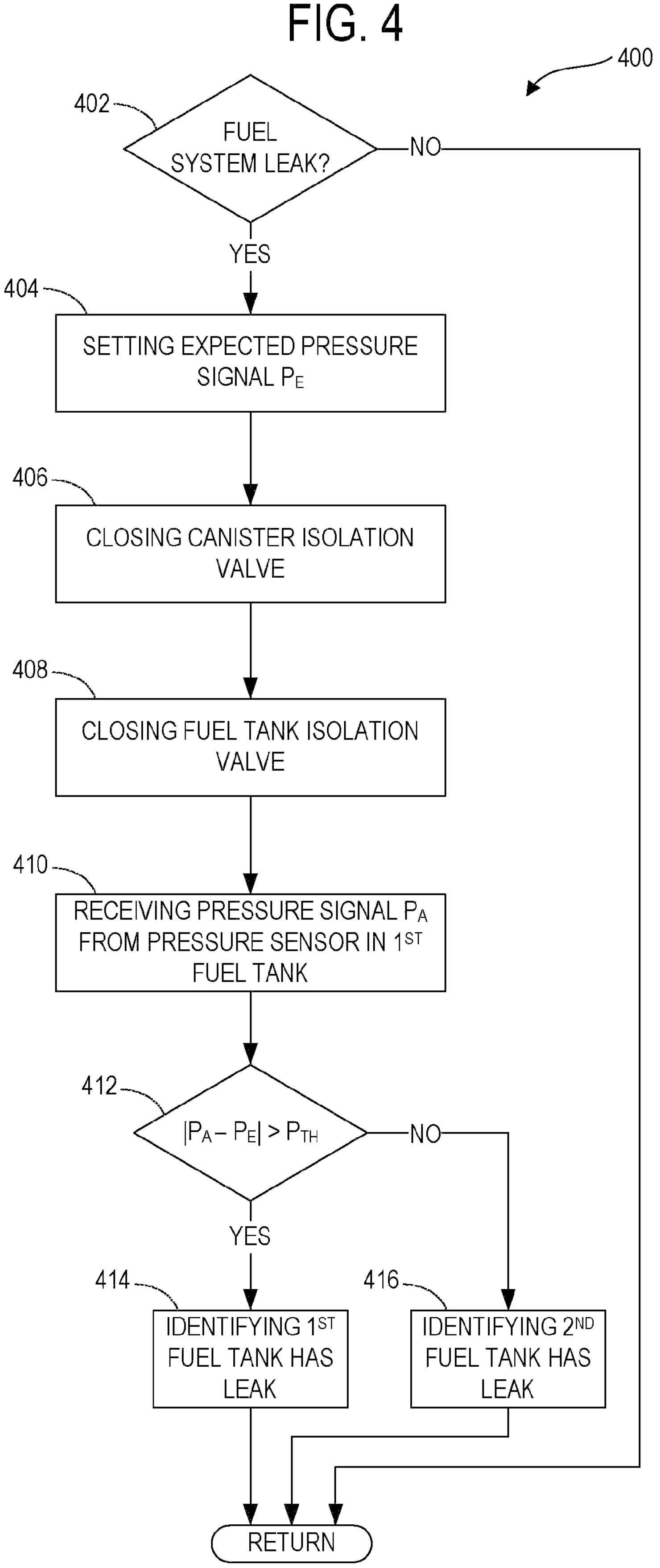
FIG. 4 is a flowchart illustrating a detailed example method for controlling a fuel system of a vehicle with one pressure sensor.

FIG. 1 is a schematic view illustrating an example cylinder of an engine, with various inputs and outputs. FIG. 2 is a schematic view of a vehicle fuel system with multiple fuel tanks, where each fuel tank may store two different fuel types. FIG. 3 provides a method overview for performing fuel system leak diagnostics, and FIG. 4 illustrates a detailed method for identifying which of a first and second fuel tank include a fuel system leak, using one pressure sensor. FIG. 6 shows an alternate method for identifying which of a first and second fuel tank include a fuel system leak, using pressure sensors coupled to each fuel tank.

Referring now to FIG. 1, it shows a schematic diagram including one cylinder of a multi-cylinder engine 10, which may be included in a propulsion system of an automobile. Engine 10 may be controlled at least partially by a control system including an electronic controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake fuelling valve 52 and exhaust fuelling valve 54. In some embodiments, combustion chamber 30 may include two or more intake fuelling valves and/or two or more exhaust fuelling valves.

In this example, intake fuelling valve 52 and exhaust fuelling valves 54 may be controlled by cam actuation via respective cam actuation systems 51 and 53. Cam actuation systems 51 and 53 may each include one or more cams and may utilize one or more of cam profile switching (CPS), variable cam timing (VCT), variable fuelling valve timing (VVT) and/or variable fuelling valve lift (VVL) systems that may be operated by electronic controller 12 to vary fuelling valve operation. The position of intake fuelling valve 52 and exhaust fuelling valve 54 may be determined by position sensors 55 and 57, respectively. In alternative embodiments, intake fuelling valve 52 and/or exhaust fuelling valve 54 may be controlled by electric fuelling valve actuation. For example, cylinder 30 may alternatively include an intake fuelling valve controlled via electric fuelling valve actuation and an exhaust fuelling valve controlled via cam actuation including CPS and/or VCT systems.

A fuel injector 66 is shown arranged in intake manifold 44 in a configuration that provides what is known as direct injection of fuel into the combustion chamber 30. Fuel injector 66 may inject fuel in proportion to the pulse width of signal FPW received from electronic controller 12 via electronic driver 68. Fuel may be delivered to fuel injector 66 by a fuel system (not shown) including a storage tank, a fuel pump, and a fuel rail. In some embodiments, combustion chamber 30 may alternatively or additionally include a fuel injector coupled indirectly to combustion chamber 30 for injecting fuel in a manner known as port injection.

As depicted in FIG. 1, a fuel injector 67 is shown arranged in intake manifold 44 in a configuration that provides what is known as port injection of fuel into the intake port upstream of combustion chamber 30. Fuel injector 67 may inject fuel in proportion to the pulse width of signal FPW received from electronic controller 12 via electronic driver 68. Fuel may be delivered to fuel injector 67 by a fuel system (not shown) including a storage tank, a fuel pump, and a fuel rail.

Intake passage 42 may include a throttle 62 having a throttle plate 64. In this particular example, the position of throttle plate 64 may be varied by electronic controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to electronic controller 12 by throttle position signal TP. Intake passage 42 may include a mass air flow sensor 120 and a manifold air pressure sensor 122 for providing respective signals MAF and MAP to electronic controller 12.

Ignition system 88 can provide an ignition spark to combustion chamber 30 via spark plug 92 in response to a spark advance signal SA from electronic controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Emission control device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Emission control device 70 can include multiple catalyst bricks, in one example. In another example, multiple emission control devices, each with multiple bricks, can be used. Emission control device 70 can be a three-way type catalyst in one example.

Electronic controller 12 is shown in FIG. 1 as a microcomputer, including microprocessor unit 2, input/output ports 104, an electronic storage medium for executable programs and calibration values shown as read only memory 106 in this particular example, random access memory 108, keep alive memory 110, and a data bus. Electronic controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from manifold air pressure sensor 122. Engine speed signal, RPM, may be generated by electronic controller 12 from signal PIP. Manifold pressure signal MAP from a manifold pressure sensor may be used to provide an indication of vacuum, or pressure, in the intake manifold. In one example, the engine position sensor 118 may produce a predetermined number of equally spaced pulses every revolution of the crankshaft from which engine speed (RPM) can be determined.

Storage medium read-only memory 106 can be programmed with computer readable data representing instructions executable by processor 2 for performing the methods described below as well as other variants that are anticipated but not specifically listed.

In some embodiments, the engine may be coupled to an electric motor/battery system in a hybrid vehicle. The hybrid vehicle may have a parallel configuration, series configuration, or variation or combinations thereof.

As described above, FIG. 1 shows only one cylinder of a multi-cylinder engine, and that each cylinder may similarly include its own set of intake/exhaust fuelling valves, fuel injector, spark plug, etc.

Referring now to FIG. 2, a schematic view of a vehicle fuel system 200 is shown. Fuel systems and associated methods disclosed in U.S. application Ser. No. 12/402,999, are hereby incorporated in entirety.

The fuel system 200 may include a fuel reservoir 204 upstream of a first fuel tank 206 and a second fuel tank 211. The fuel reservoir 204 may receive fuel via a fuel fill neck 202 and may be configured to hold a predetermined amount of fuel for a period of time, before directing the fuel to the first fuel tank 206 and/or the second fuel tank 211. Fuel from the fuel reservoir 204 may be selectively directed to one or more of the fuel tanks based on fuel type as detected by a fuel type sensor 215 (e.g., a chemical fuel type sensor) coupled to the fuel reservoir 204 in this example.

The fuel system 200 may also include a first fuel conduit 248 including a first selector valve 208 connecting the fuel reservoir 204 and the first fuel tank 206. The fuel type sensor 215 can send a fuel type signal to an electronic controller 12, which can thereby control fuel flow to the first fuel tank 206 and/or the second fuel tank 211, via adjustment of the position of the first selector valve 208 responsive to a signal received from the electronic controller 12. Similarly, a second fuel conduit 250 including a second selector valve 213 connects the fuel reservoir 204 and the second fuel tank 211. The second selector valve 213 may be disposed fluidically between the fuel reservoir 204 and the second fuel tank 211, such that adjusting the position of the second selector valve 213 controls the flow of fuel to the second fuel tank 211. Thus, the selector valves selectively control flow to one or more of the fuel tanks by positioning the selector valves based on the fuel type.

The first fuel tank may include or store a first fuel type, and the second fuel tank may include a second fuel type, where the first fuel type is different from the second fuel type in some examples.

Further, a drain tube 252 connecting the fuel reservoir 204 to the first fuel tank 206 and the second fuel tank 211 is provided. The drain tube 252 can allow drainage of fuel in the fuel reservoir 204 to a first or second fuel tank when fuelling via the fuel neck 202 has stopped. In a case where a fuel tank to which the fuel should be directed based on fuel type is full and cannot accept more fuel, the fuel left in the fuel reservoir 204 may drain to another fuel tank. It may be appreciated that the drain tube 252 includes at least a tube portion with a restricting portion 254. In one example, the diameter of the drain tube is selected to reduce interference of the drain tube with fuel system diagnostics. For example, the diameter of the drain tube 252 can be set such that the pressure reduction effects of fuel vapor escape via the drain tube 252 during fuel system diagnostic testing will be distinguishable from the pressure reduction effects of fuel vapor escape through a hole during fuel system diagnostic testing, thus allowing detection of a fuel system leak. In some cases, this may mean that the diameter of the drain tube 252 is above a predetermined value, such as 0.08 inches.

Although the system is depicted as including two fuel tanks in FIG. 2, any number of fuel tanks, each with a respective selector valve, may be included in the fuel system and methods disclosed herein.

Referring now to fuel and fuel vapor flow through the fuel system 200 downstream of the selector valves 208 and 213, the first fuel tank 206 includes a first pressure sensor 240. The fuel system 200 may also include a canister isolation valve 244, located downstream of the first fuel tank 206 and positioned, and/or actuatable, to seal off fuel vapor flow to the charcoal canister 256. In this example, a charcoal canister is located downstream of the canister isolation valve 244, such that when the canister isolation valve 244 is open, fuel vapor flow can flow to the charcoal canister 256 from the first fuel tank 206. The fuel system 200 also includes a fuel tank isolation valve 246 downstream of the second fuel tank 211 and upstream of the canister isolation valve 244. Thus, the fuel tank isolation valve 246 may be actuatable, or otherwise positioned, to selectively decouple the first fuel tank 206 and the second fuel tank 211. Thus, fuel vapor flow from the second fuel tank 211 can also flow to the charcoal canister 256 if the fuel tank isolation valve 246 is open. Further, a canister vent is provided to allow air flow from the charcoal canister 256 to the atmosphere. Further still, a purge valve can be opened to purge the charcoal canister by taking in air from the intake manifold.

The fuel system 200 includes the electronic controller 12, which may include code that identifies which of the first fuel tank 206 and second fuel tank 211 includes a fuel system leak by selectively decoupling the first fuel tank 206 and the second fuel tank 211 via the fuel tank isolation valve 246, responsive to an identification of the fuel system leak, as will be described.

In some examples, selectively decoupling includes closing the canister isolation valve 244 and the fuel tank isolation valve 246. Selectively decoupling the first fuel tank and the second fuel tank may include sealing off one tank from the other, such that the tanks are substantially isolated from one another. Thus, the fuel system may be made fluidically discontinuous. However, in some examples, (e.g., when a drain tube exists), the fuel system may be fluidically continuous by way of the drain tube even when a fuel tank isolation valve is closed. In a fuel system with a drain tube such as that described here, provisions for detecting a fuel system leak can be made, such as setting the diameter of the drain tube to a particular value substantially different (e.g., bigger) from an expected size of a hole causing a fuel system leak. In another example, decoupling the tanks may include partially or wholly sealing off one fuel tank from another fuel tank. Under some engine operating conditions, selectively decoupling may include sealing and unsealing the tanks, such that they are partially or wholly coupled for a selected duration. The electronic controller 12 may identify which of the fuel tanks has the fuel system leak by receiving a pressure signal from the first pressure sensor 240, and identifying that the first fuel tank 206 has the fuel system leak when a difference between the pressure signal received from the first pressure sensor 240 and an expected pressure signal is above a predetermined difference threshold. On the other hand, the electronic controller 12 may identify that the second fuel tank 211 has the fuel system leak when the difference between the pressure signal received from the first pressure sensor 240 and the expected pressure signal is below the predetermined difference threshold. Further details of such an approach are described with respect to FIGS. 5-6.

In some examples, the pressure signal and expected pressure signal may be an absolute pressure value calculated based on various engine operating conditions, looked up in a look-up table, or they may be based on calibrated values. In another example, the pressure signal can be a pressure reduction rate (e.g., over time), and the expected pressure signal is an expected pressure reduction rate (e.g., over time). That is, the slope of an actual pressure reduction rate may be compared to the slope of an expected pressure signal. It may be appreciated that expected pressure signals can be based on fuel type and/or fuel quantity in the first fuel tank and/or the second fuel tank, fuel type being detected by the fuel type sensor 215 as fuel flows into the fuel reservoir 204.

Further, the electronic controller may also identify which of the first fuel tank and the second fuel tank includes the fuel system leak based on operating conditions, such as engine load, engine speed, engine temperature, etc.

In the case where there are more than two fuel tanks, upon identification of a fuel system leak, systematic actuation of second, third, fourth etc. fuel tank isolation valves (and combinations thereof) may be carried out to determine which of the fuel tanks contains the fuel system leak.

Also, identification of a fuel system leak, and further identification of which of a plurality of fuel tanks includes the fuel system leak may be carried out by one or more instances of fuel system diagnostic testing.

In some fuel system embodiments, as will be described with respect to FIG. 5, the second fuel tank 211 can include a second pressure sensor 242 for use in fuel system leak diagnostic testing. In such a case, selectively decoupling the first fuel tank 206 and the second fuel tank 211 may include closing the fuel tank isolation valve 246, and receiving a first pressure signal from the first pressure sensor 240 and a second pressure signal from the second pressure sensor 242, at the electronic controller 12. Thus, the localization of the fuel system leak may be accomplished by identifying that the first fuel tank 206 has the fuel system leak when the difference between the first pressure signal and a first expected pressure signal is above a first difference threshold. On the other hand, it may be identified that the second fuel tank 211 has the fuel system leak when a difference between the second pressure signal and a second expected pressure signal is above a second difference threshold.

In a case where a first pressure signal is received from a first pressure sensor in a first fuel tank and a second pressure signal is received from a second pressure sensor in a second fuel tank, the first expected pressure signal (e.g., pressure reduction rate) is based on the fuel type and/or fuel quantity in the first fuel tank when the canister isolation valve is closed and the fuel tank isolation valve is closed. Similarly, a second expected pressure signal (e.g., pressure reduction rate) may be set for the second fuel tank, based on fuel type and/or fuel quantity in the second fuel tank when the fuel tank isolation valve is closed.

During fuel system leak diagnostics, a natural vacuum may be formed in the first fuel tank and/or the second fuel tank dependent on the positions of the canister isolation valve and the fuel tank isolation valve(s). This may occur, for example, when the engine is shut off and/or the vehicle is shut down, where natural temperature swings can be used to generate "natural vacuum". Alternatively, fuel system leak diagnostic testing may be carried out by pumping-down a first fuel tank and a second fuel tank and subsequently observing or measuring the pressure reduction rate of first and second fuel tanks.

Turning now to FIG. 3, a flowchart illustrates an example method 300 for controlling a fuel system of a vehicle. At 302, it is determined if a fuel system leak has been detected. Responsive to a positive identification of a fuel system leak, the method 300 includes decoupling a first fuel tank including a first fuel type and a second fuel tank including a second fuel type at 304. Further, the method includes identifying which of the first fuel tank and the second fuel tank includes the fuel system leak at 306. If a fuel system leak is not detected at 302, the routine returns to the beginning.

Referring to FIG. 4, a detailed method 400 for controlling a vehicle fuel system with a pressure sensor in the first fuel tank is illustrated as a flowchart. The method 400 includes determining if a fuel system leak is present at 402. The fuel system leak may be identified at 402 by performing a first leak detection test on the fuel system, wherein a canister isolation valve is closed and a fuel tank isolation valve is open during the first leak detection test. In one example, the pressure reduction rate may be measured at a first fuel tank, and if the pressure reduction rate is greater than expected (e.g., based on the fuel composition, fuel type, and/or fuel quantity for the entire fuel system), it is determined that there is a fuel system leak somewhere in the fuel system.

If the answer is yes at 402, the method 400 may include setting an expected pressure signal $P_E$ for a first fuel tank based on one or more of the first fuel type and a first fuel quantity in the first fuel tank at 404. The method may further include decoupling the first fuel tank and the second fuel tank responsive to the identification of a fuel system leak at 402, where the decoupling may include closing a canister isolation valve positioned downstream of the first fuel tank at 406, and closing a fuel tank isolation valve positioned downstream of the second fuel tank and upstream of the canister isolation valve at 408.

The method can include storing a first fuel type in the first fuel tank, and storing the second fuel type in the second fuel tank, such that the decoupling of the first fuel tank and the second fuel tank is carried out when the first fuel type is stored in the first fuel tank and the second fuel type is stored in the second fuel tank.

In one example, to provide improved fuel system diagnostics reliability, the closing of the fuel tank isolation valve may include closing the fuel tank isolation valve before a minimum pressure point of a pressure of the first fuel tank. That is, in order to observe sufficient pressure reduction such that a pressure reduction rate may be calculated, the second fuel tank is isolated (e.g., via closing of the fuel tank isolation valve) when the second fuel tank still has a sufficiently high pressure, which is indicated by a pressure of the first fuel tank being above a minimum pressure point because the pressure of the first fuel tank is equivalent to the pressure of the second fuel tank when the fuel tank isolation valve is open. In other cases, the pressure of the second tank may be directly measured and thus the closing of the fuel tank isolation valve may be carried out prior to a minimum pressure point of a pressure of the second fuel tank as measured by the pressure sensor in the second fuel tank.

At 410, the method includes receiving a pressure signal PA from the first pressure sensor in the first fuel tank at an electronic controller. It can be determined at 412 if the difference between the pressure signal PA and the expected pressure signal $P_E$ is above a difference threshold $P_{TH}$. If the answer is yes at 412, the method includes identifying that the first fuel tank has the fuel system leak at 414. That is, if a pressure signal (e.g., pressure reduction rate) is substantially greater than an expected pressure signal (e.g., expected pressure reduction rate) as determined at 412, the fuel system leak is located in the first fuel tank because the measurements are taken when the first fuel tank was isolated from the rest of the fuel system.

Conversely, if the difference between the pressure signal and the expected pressure signal is below the difference threshold at 412, the method includes identifying that the second fuel tank has the fuel system leak at 416. That is, when the pressure signal $P_E$ is taken at the first fuel tank when the first fuel tank is isolated from the remainder of the fuel system, and the pressure signal is not substantially different from the expected pressure signal (e.g., indicating no leak in the closed system including the first fuel tank), then the fuel system leak is elsewhere in the fuel system, such as the second fuel tank. If there is not a fuel system leak detected at 402, the routine may return to the beginning.

Figure 5:
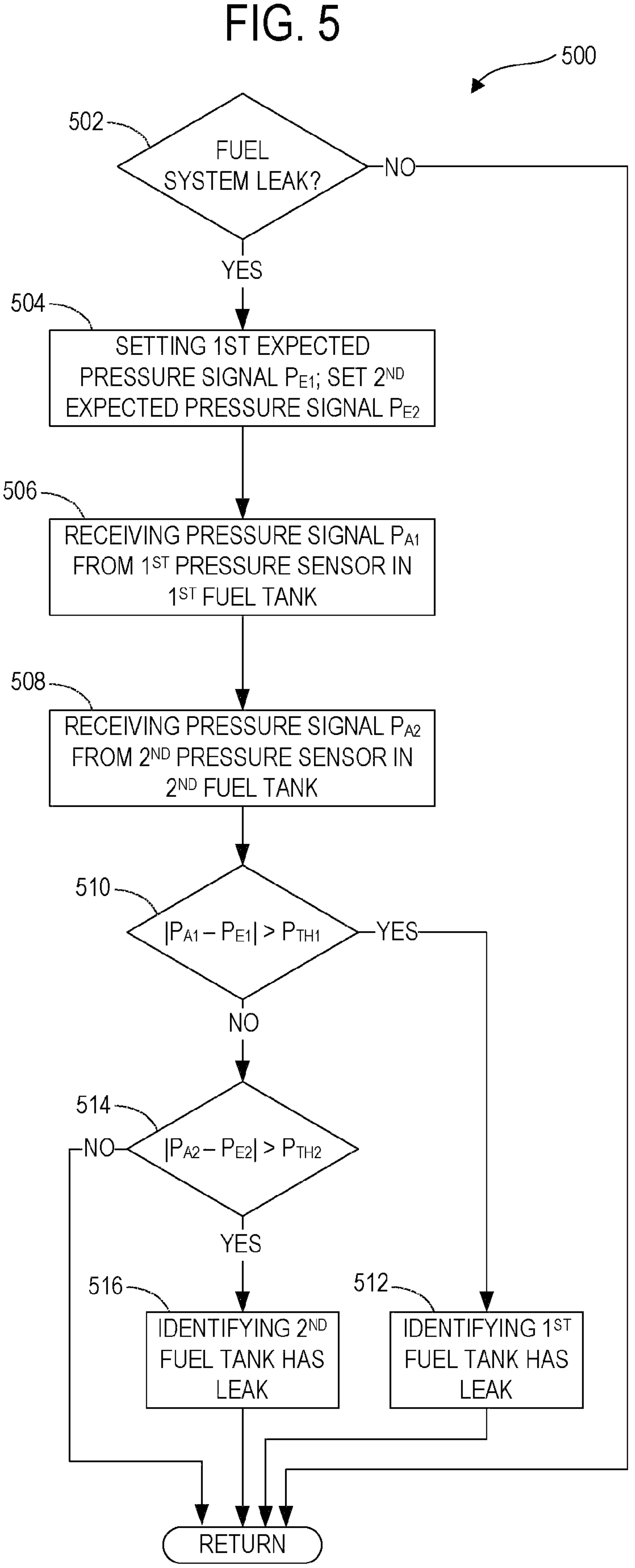
FIG. 5 is a flowchart illustrating a second detailed example method for controlling a fuel system of a vehicle with two pressure sensors.

Referring now to FIG. 5, a second exemplary method 500 for controlling a fuel system of a vehicle with more than one pressure sensor is illustrated as a flowchart. First, it is determined if a fuel system leak is present at 502. If the answer is yes, the method 500 includes setting a first expected pressure signal $P_{E1}$ based on fuel type and/or fuel quantity in the first fuel tank at 504. The method also includes setting a second expected pressure signal based on fuel type and/or fuel quantity in the second fuel tank at 504. A fuel tank isolation valve and a canister isolation valve may be closed so as to isolate the fuel tanks and the method includes receiving a first pressure signal $P_{A1}$ from a first pressure sensor in the first fuel tank at an electronic controller at 506. At 508, the method 500 includes receiving a second pressure signal $P_{A2}$ from a second pressure sensor in the second fuel tank at the electronic controller.

Thus, at 510, the method 500 includes determining if a difference between the first pressure signal $P_{A1}$ and a first expected pressure signal $P_{E1}$ is above a first difference threshold $P_{TH1}$. If yes, the method includes identifying that the first fuel tank has a fuel system leak at 512. However, if the answer is no at 510, the routine proceeds to 514, where it is determined if a difference between the second pressure signal $P_{A2}$ and a second expected pressure signal $P_{E2}$ is above a second difference threshold $P_{TH2}$. If the answer is yes at 514, the method includes identifying that the second fuel tank has a fuel system leak at 516. If there is no fuel system leak detected at 502, the routine may return. Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As such, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a fuel system of a vehicle, the method including:

decoupling, via an electronic controller, a first fuel tank including a first fuel type and a second fuel tank including a second fuel type, responsive to an identification by the controller of a fuel system leak; and identifying, via the controller, which of the first fuel tank and the second fuel tank includes the fuel system leak.

2. The method of claim 1, wherein the decoupling includes:

closing a canister isolation valve positioned downstream of the first fuel tank, and closing a fuel tank isolation valve positioned downstream of the second fuel tank and upstream of the canister isolation valve.

3. The method of claim 2, wherein closing the fuel tank isolation valve includes closing the fuel tank isolation valve before a minimum pressure point of a pressure of the first fuel tank.

4. The method of claim 1, further comprising storing the first fuel type in the first fuel tank, and storing the second fuel type in the second fuel tank, wherein the decoupling is carried out when the first fuel type is stored in the first fuel tank and the second fuel type is stored in the second fuel tank.

5. The method of claim 1, further comprising:

setting an expected pressure signal based on one or more of the first fuel type and a first fuel quantity in the first fuel tank, and receiving a pressure signal from a first pressure sensor in the first fuel tank at the electronic controller.

6. The method of claim 5, wherein the identifying includes:

identifying that the first fuel tank has the fuel system leak when a difference between the pressure signal and the expected pressure signal is above a difference threshold, and identifying that the second fuel tank has the fuel system leak when the difference between the pressure signal and the expected pressure signal is below the difference threshold.

7. The method of claim 5, wherein the pressure signal is a pressure reduction rate, and the expected pressure signal is an expected pressure reduction rate.

8. The method of claim 1, wherein the fuel system leak is identified by performing a first leak detection test on the fuel system, and wherein a canister isolation valve is closed and a fuel tank isolation valve is open during the first leak detection test.

9. A method for controlling a fuel system of a vehicle comprising:

setting a first expected pressure signal based on one or more of a fuel type and a fuel quantity in a first fuel tank;

setting a second expected pressure signal based on one or more of a fuel type and a fuel quantity in a second fuel tank, wherein fuel type is detectable by a fuel type sensor in a fuel reservoir located upstream of the first fuel tank and the second fuel tank;

receiving a first pressure signal from a first pressure sensor in the first fuel tank, at an electronic controller;

receiving a second pressure signal from a second pressure sensor in the second fuel tank at the electronic controller;

identifying that the first fuel tank has a fuel system leak when a difference between the first pressure signal and the first expected pressure signal is above a first difference threshold; and identifying that the second fuel tank has a fuel system leak when a difference between the second pressure signal and the second expected pressure signal is above a second difference threshold.

* * * * *